United States Patent [19]

Connor et al.

[11] 4,334,550

[45] Jun. 15, 1982

[54] SEALING MEANS FOR SLIDING GATE VALVE

[75] Inventors: Peter J. Connor, Bethlehem; Donald K. Hagar, Macungie, both of Pa.

[73] Assignee: Mosser Industries, Inc., Bethlehem, Pa.

[21] Appl. No.: 639,871

[22] Filed: Dec. 10, 1975
(Under 37 CFR 1.47)

[51] Int. Cl.³ .................. F16K 3/312; F16K 3/02; F16K 25/00
[52] U.S. Cl. .................................. 137/242; 137/240; 137/614.21; 251/174; 251/175; 251/328; 138/94.3
[58] Field of Search ............... 251/174, 175, 328, 214, 251/327; 137/242; 138/94.3

[56] References Cited

U.S. PATENT DOCUMENTS

| | | | |
|---|---|---|---|
| 1,054,150 | 2/1913 | Thorsby | 138/94.3 |
| 2,732,170 | 1/1956 | Shand | 251/174 X |
| 3,206,162 | 9/1965 | Bogot | 251/214 X |
| 3,228,389 | 1/1966 | Lowe et al. | 126/285 |
| 3,333,816 | 8/1967 | Williams et al. | 251/327 |
| 3,504,883 | 4/1970 | Beck | 251/172 |
| 3,698,429 | 10/1972 | Lowe et al. | 251/174 X |
| 3,738,393 | 6/1973 | Alexandrov et al. | 138/94.3 |
| 3,799,187 | 3/1974 | Armstrong | 251/328 X |

FOREIGN PATENT DOCUMENTS 324654  8/1920  Fed. Rep. of Germany ...... 251/174

Primary Examiner—Arnold Rosenthal
Attorney, Agent, or Firm—Sutherland, Asbill & Brennan

[57] ABSTRACT

A gate valve apparatus suitable for controlling the flow of fluids in a conduit, especially gases in high temperature applications, is disclosed. The apparatus includes a gate member adapted for sliding movement through an aperture in the gate valve assembly. Each opposing side of the aperture has fixedly mounted cooperating flat sealing strips to seal the aperture in both the conduit-open and conduit-closed positions. In certain embodiments a plurality of substantially parallel gate members, each having aperture sealing means, may be used to provide increased sealing effectiveness for highly toxic gaseous mediums.

13 Claims, 9 Drawing Figures

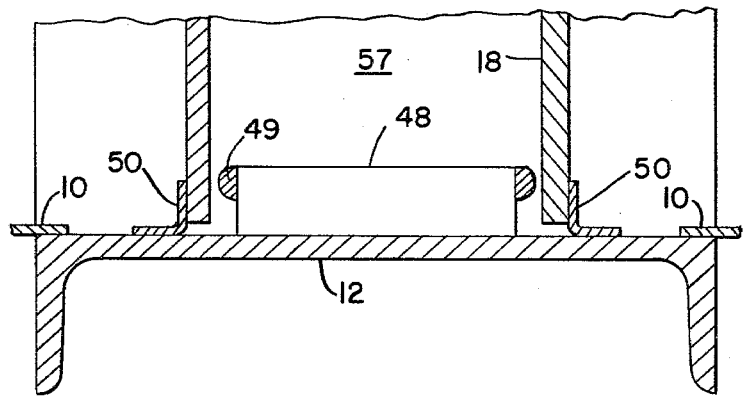
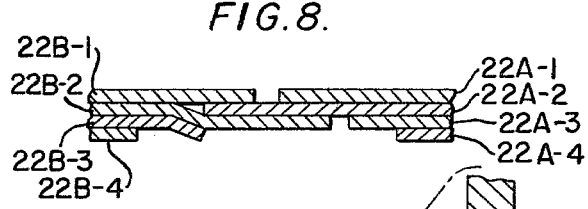
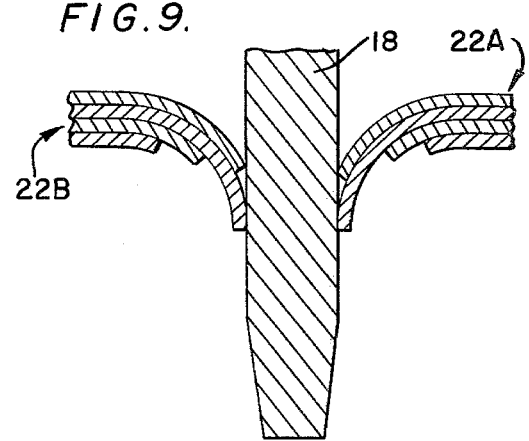
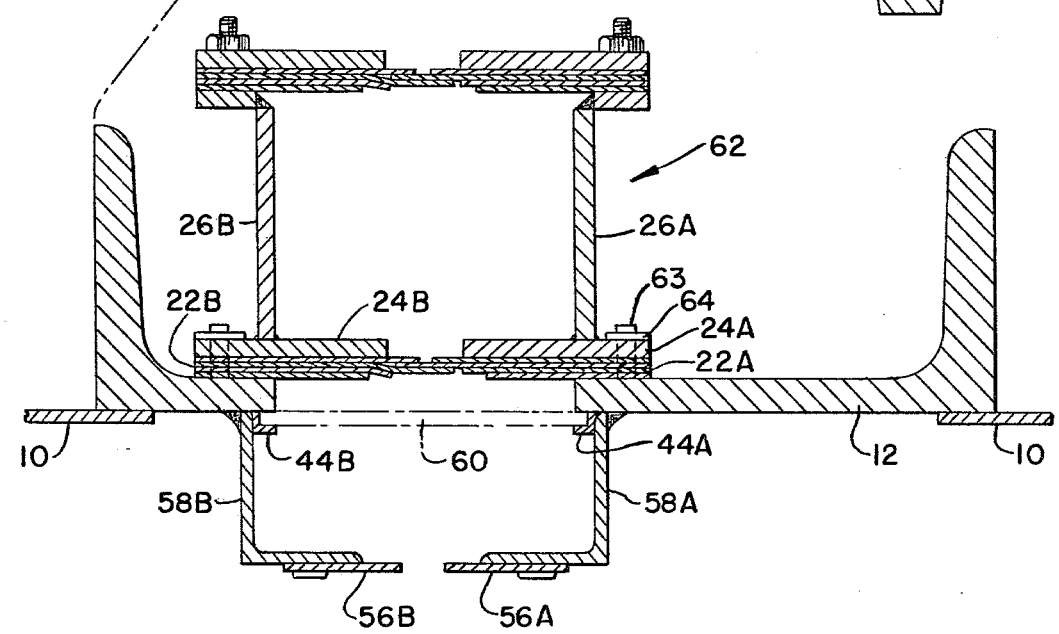

SEALING MEANS FOR SLIDING GATE VALVE

This invention relates to a gate valve apparatus for controlling the flow of fluids, especially gases, in a conduit. The apparatus utilizes resilient, fluid-impermeable, cooperating flat sealing strips mounted on opposing sides of the gate valve assembly aperture to effect sealing of the aperture. The aperture allows movement of a slidable gate member to control the flow of a fluid in the conduit. The flat sealing strips cooperate with the slidable gate member in the conduit-closed position, and overlap with one another in the conduit-open position, to prevent escape of the fluid medium through the gate valve assembly aperture.

In a gate valve of the type permitting complete withdrawal of the gate member from the conduit, it is desirable that there be automatic means for sealing the gate valve assembly aperture through which the slidable flow control gate member is inserted and withdrawn, so as to prevent escape of the fluid through the aperture. The present invention provides such an automatic sealing means which depends upon the resilient characteristics of cooperating fluid-impermeable flat strips to effect sealing of the aperture in both the conduit-open and conduit-closed positions and eliminates the necessity for the complex spring and cooperating sliding member arrangements disclosed in the prior art to seal the aperture.

These and other aspects and advantages of the present invention are more apparent in the following detailed description and claims, particularly when considered in conjunction with the accompanying drawing, in which like parts bear like reference numerals. In the drawings:

FIG. 6 is a fragmentary, horizontal, sectional view taken along line 6—6 of FIG. 4;

FIG. 7 is a vertical cross-sectional view of a modification of the single slidable gate member sealing structure of FIG. 2;

FIG. 8 is a cross-sectional view of the opposing sealing strip stacks in the conduit-open position; and FIG. 9 is a cross-sectional view of the opposing sealing strip stacks in the conduit-closed position.

Figure 1:
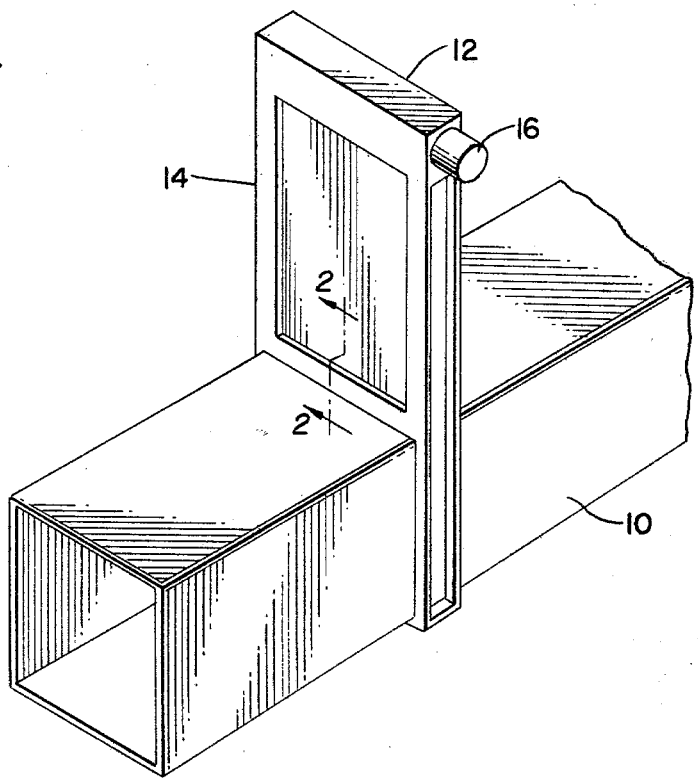
FIG. 1 is a perspective view of the gate valve assembly and conduit in its structural environment.

In FIG. 1 the gate valve assembly frame 12 is shown in the structural environment of a conduit 10 for the transport and containment of a gaseous medium. The upper portion of the gate valve assembly has a gate member housing 14 for containment and storage of the slidable gate member 18 in FIG. 2 when the slidable gate member is in the conduit-open position. A motor 16 cooperates with means well known in the art (not shown) to move slidable gate member 18 between the conduit-open and conduit-closed positions.

Figure 2:
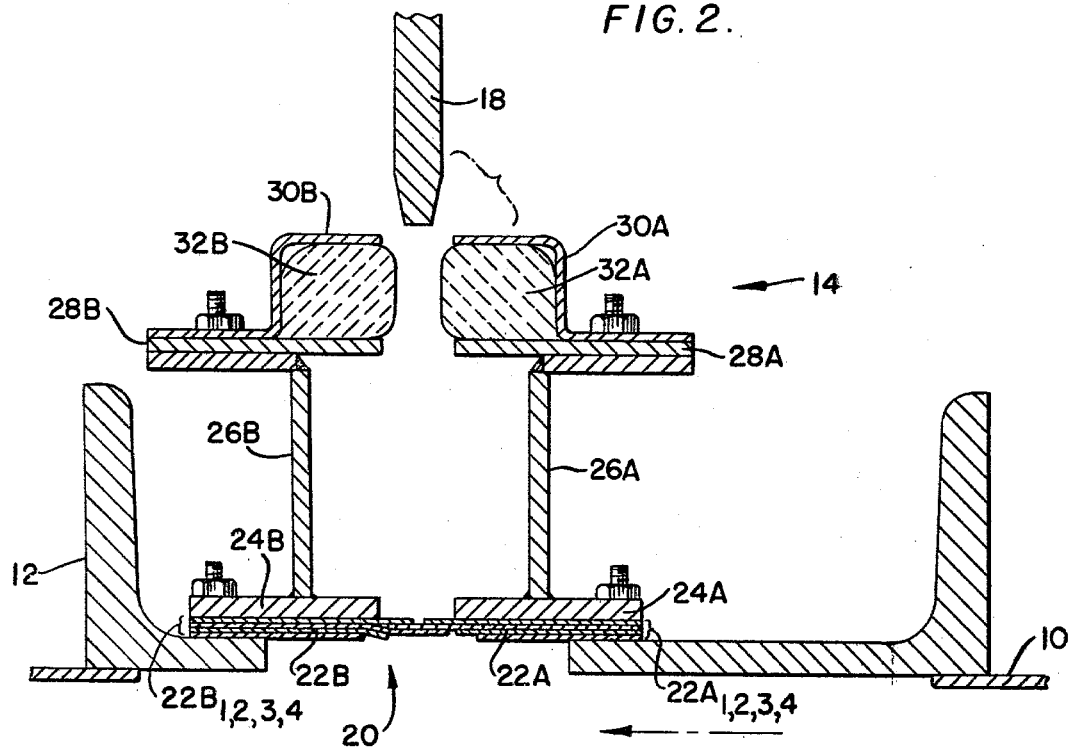
FIG. 2 is an enlarged, detailed, fragmentary, sectional view of the gate valve assembly aperture sealing means taken along the line 2—2 of FIG. 1.

FIG. 2 presents a preferred embodiment of the means to seal the aperture 20 in the gate valve assembly frame 12 which permits insertion of the slidable gate member 18 into the conduit 10 to effect flow control of the gaseous medium. The slidable gate member 18 in FIG. 2 is shown in the conduit-open position. The gas flow in the conduit 10, shown by the arrow, is unimpeded and the gaseous medium is prevented from escaping into the slidable gate member housing 14 by the cooperating flat sealing strips in stacks 22A and 22B. The sealing strips are made of fluid-impermeable, resilient material. In high temperature applications it has been found that spring-tempered sheet metal sealing strips of 0.007 inches are preferred, a sealing strip thickness range of about 0.005 to 0.01 inches being preferred. The drawings depict the flat sealing strips with exaggerated thicknesses relative to the dimensions of the other components of the apparatus for the purpose of facilitating pictorial representation.

Figure 3:
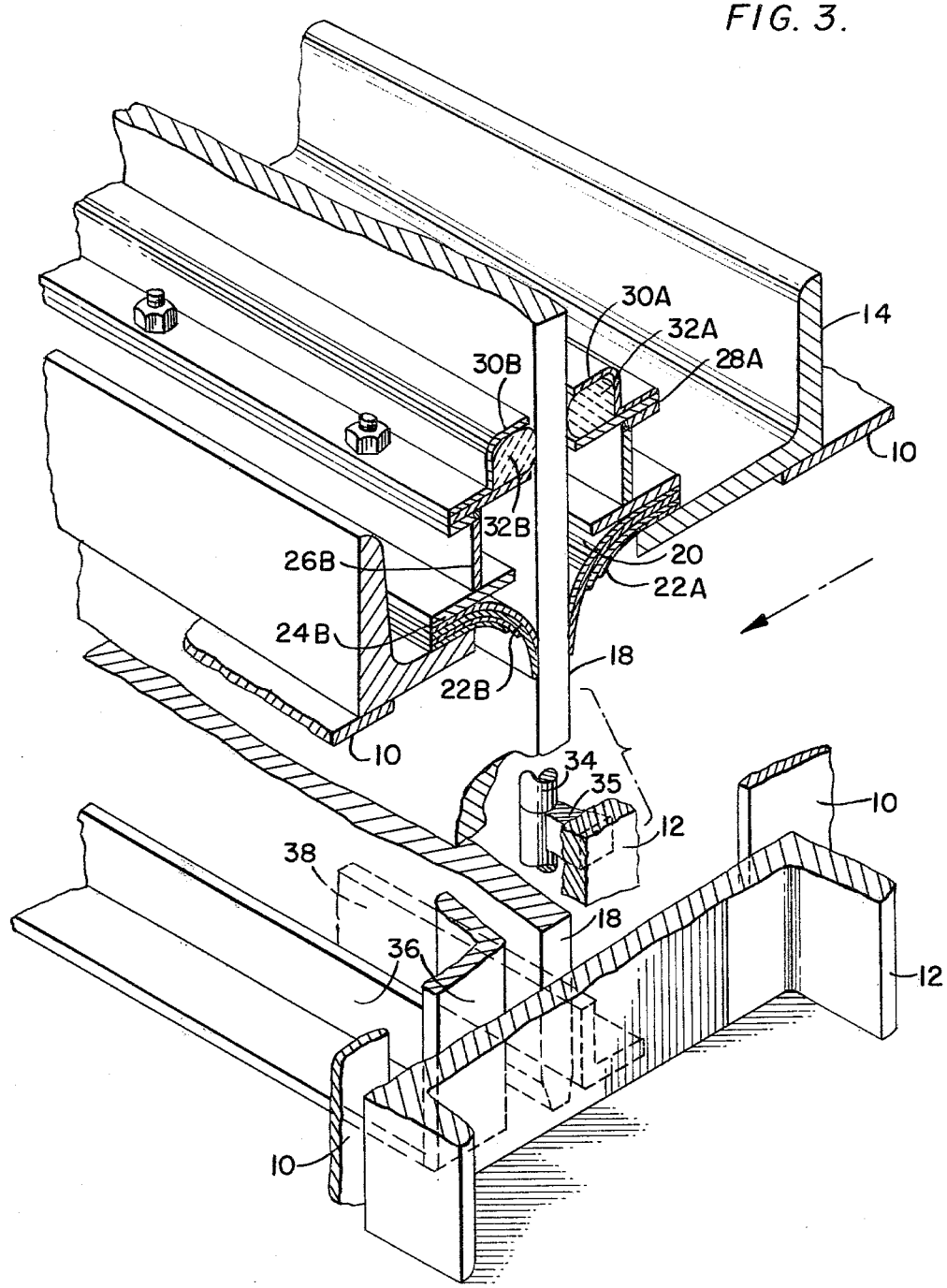
FIG. 3 is an enlarged, detailed, fragmentary, perspective view of the sealing means for the slidable gate member.

Each of the opposing sealing strip stacks 22A and 22B is composed of four flat strips of metal 22A-1 through 4 and 22B-1 through 4, respectively. As depicted in FIG. 8, the sealing of aperture 20 when gate member 18 is in the conduit-open position is effected by the overlapping of two or more of the sealing strips, i.e., by strip 22A-2 being sandwiched between opposing strips 22B-1 and 22B-2. This is the position of those strips at rest. As depicted in FIG. 8 flexure deformed strips 22B-3 and 22B-4 exert a compressive force to seal cooperating overlapped strips 22B-1 and 22A-2. However, when gate member 18 is inserted into conduit 10, as depicted in FIG. 3, the sealing strips are bent aside by the gate member. This creates tension in the strips, resulting in their being biased against the opposite faces of gate member 18 in sealing engagement therewith. As depicted in FIG. 9, the strips being numerically identical to the strips designated in FIG. 8, only the top two sealing strips on each side (22A-1 and 2 and 22B-1 and 2) engage gate member 18. As is apparent from the drawings, wide variation is possible as regards the total number of sealing strips employed, as well as how many opposing sealing strips overlap to effect a seal in the conduit-open position, how many opposing strips actually engage the faces of the gate member to effect a seal in the conduit-closed position, and how many, if any, serve only to reinforce the gate-engaging strips. The minimum requirement, of course, is one strip for each side of the aperture, so mounted that they will overlap at rest, when the gate member is in the conduit-open position, and will be biased against the opposing faces of the gate member when the latter is in the conduit-closed position. It is preferred, however, that there be a plurality of gate-engaging strips on each side of the aperture, for example, two or three, and that at least one of those gate-engaging strips be so positioned that it will be guided into a sandwiched position between two of the gate-engaging strips on the opposite side of the aperture when the gate is withdrawn from the aperture. It is also preferred that there be at least one reinforcing strip on each side of the aperture.

Retainer plates 24A and 24B are fixedly mounted on that gate valve assembly frame 12 and contact and fixedly position the respective sealing strip stacks 22A and 22B on opposing sides of aperture 20. The retainer plates 24A and 24B reinforce and prevent buckling of the sealing strips when the slidable gate member 18 is withdrawn from the conduit 10. Spacer plates 26A and 26B are respectively fixedly mounted on retainer plates 24A and 24B and cooperate with aperture block mounting plates 28A and 28B to form a station for aperture blocks 32A and 32B. The aperture blocks 32A and 32B are fixedly mounted on the aperture block mounting plates 28A and 28B by aperture block retainer plates 30A and 30B. In the preferred embodiment for high temperature applications the aperture blocks 32A and 32B are Inconel cylinders with a ceramic cloth outer layer. The aperture blocks 32A and 32B contact the slidable gate member 18 in the conduit-closed position (FIG. 3) to operate as a secondary seal to prevent escape of the gaseous or fluid medium into gate member housing 14.

In FIG. 3, a fragmentary perspective view of the slidable gate member 18 in the conduit-closed position is presented. As described in detailed FIG. 9 the cooperating flat sealing strips 22A-1 and 2 and 22B-1 and 2 contact the slidable gate member 18 to effect sealing and prevent escape of the fluid medium through the aperture 20 into the gate member housing 14. Flat sealing strips 22A-3 and 4 and 22B-3 and 4, protruding a shorter distance into the aperture than flat sealing strips 22A-1 and 2 and 22B-1 and 2 do not contact the slidable gate member 18 but serve to bias flat sealing strips 22A-1 and 2 and 22B-1 and 2 against the opposite faces of slidable gate member 18 by applying axial contacting pressure in the conduit-closed position to seal aperture 20.

The lower portion of the fragmented view presented in FIG. 3 demonstrates one means for effecting a seal between the slidable gate member 18 and the side and bottom walls of the gate valve assembly frame 12 when the valve is in the conduit-closed position. Upstream inner side wall guide flange member 34 is attached to side wall guide flange plates 35 which are fixedly mounted on the side wall of gate valve assembly frame 12 at spaced intervals of preferably 10 to 14 inches and cooperate with downstream inner flange 36 to form a guide channel for the slidable gate member 18. The use of spaced upstream inner side wall guide flange plates 35 is preferred over a continuous upstream flange member directly affixed to the side wall of the gate valve assembly frame 12, which would form a pocket for the accumulation of foreign matter in the guide channel. The arrow in FIG. 3 defines the direction of fluid flow in the conduit. It will be noted that the fluid flow exerts a positive pressure to promote contacting of the downstream surface of the slidable gate member 18 with the respective cooperating flat surface of the downstream inner flange 36, thereby preventing leakage of the gas or fluid around the slidable gate member 18 when it is in the conduit-closed position. The upstream bottom wall has an upstream continuous seating flange 38 which cooperates with the downstream inner flange 36 to form a seating channel for the bottom edge of the slidable gate member 18.

Figure 4:
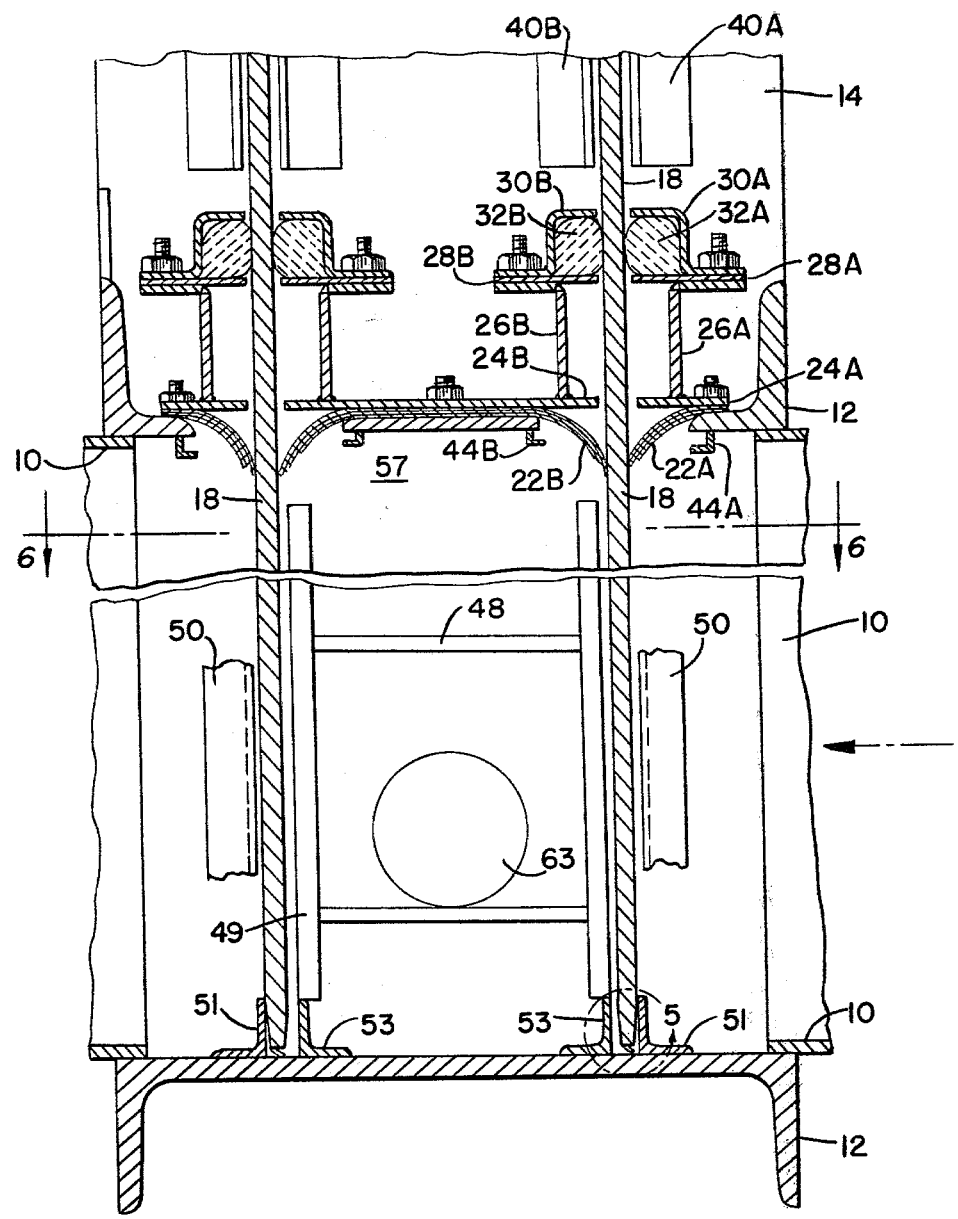
FIG. 4 is a vertical, cross-sectional view of a modification of the single slidable gate member sealing structure of FIG. 2.

FIG. 4 is a vertical cross-sectional view of a modification of the sliding gate valve assembly, showing the arrangement of two, parallel slidable gate members of the type depicted in FIG. 2. The upper fragmented portion of FIG. 4 demonstrates that the gate member housing 14 has cooperating gate housing guide channel members 40A and 40B, which are fixedly mounted on the sides of the gate member housing 14 and define a trough to guide the slidable gate member 18 during insertion and withdrawal.

Since the aperture sealing means of the two slidable gate member arrangements presented in the upper fragmentary portion of FIG. 4 are identical, only the right side aperture sealing means has been supplemented with identifying numerals. The arrow shows the fluid flow direction in conduit 10.

A modification of the gate valve assembly is shown in FIG. 4 with the inclusion of cooperating guide channel members 44A and 44B which are fixedly mounted to the gate valve assembly frame 12 below the flat sealing strips 22A and 22B. The cooperating guide channel members 44A and 44B form a channel for the placement and retention of a slidable sealing cover plate 60 (FIG. 7) which may be inserted through the channel in the conduit-open position to seal aperture 20 during the replacement or repair of the flat sealing strip stacks 22A and 22B.

In the conduit-closed position the parallel slidable gate member arrangement of FIG. 4 provides positive pressure seating of the slidable gate members 18 against the inner side wall guide and sealing flanges 50 and the inner bottom wall sealing flanges 51. The bottom wall sealing flanges 51 cooperate with inner bottom wall guide flanges 53 to form a seating channel for the slidable gate member 18. Conventional blower means (not shown) cooperating with a conduit aperture 63 are provided to introduce a positive air pressure in the space 57 between the parallel slidable gate members 18 relative to the pressure exerted by the gaseous medium in conduit 10. The blower is provided with conventional sealing means (also not shown) such as an angle wafer valve at the blower output head to prevent backflow of the gaseous medium into the blower assembly in the conduit-open valve position. The positive pressure exerts an outward force to bias the slidable gate members 18 against the inner side wall guide and sealing flanges 50 and the inner bottom wall sealing flanges 51. The only sealing surface leakage which can occur in this parallel slidable gate member arrangement under the positive pressure conditions in space 57 is outward from space 57 into the conduit 10. This arrangement is desirable in instances where a temporary interruption of the transport of a highly toxic fluid in conduit 10 is necessary.

Figure 5:
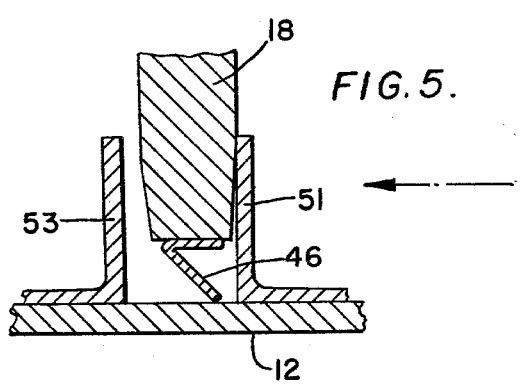
FIG. 5 is an enlarged, detailed, sectional view of the encircled area 5 of FIG. 4.

In FIG. 5, in enlarged view, is shown a preferred seating means for the bottom edge of gate member 18. Again, the arrow indicates the direction of fluid flow. Spring seal member 46 is fixedly mounted on the bottom edge of slidable gate member 18 and cooperates in sealing compression with the bottom surface of the gate valve assembly frame 12. Additionally, the upstream surface of slidable gate member 18 contacts the surface of inner bottom wall sealing flange 51 to effect a further seal to prevent fluid flow around the slidable gate member 18.

In FIG. 6 the horizontal view of the side wall of the two parallel slidable gate member arrangements of FIG. 4 is presented. Intermittent spacer channel plates 48 are fixedly mounted on the side wall of the gate valve assembly frame 12 to fixedly position continuous guide flange members 49 which cooperate with the continuous inner side wall guide and sealing flanges 50 to define a guide channel for the slidable gate member 18. Under the positive bias pressure introduced into space 57 the upstream surface of slidable gate member 18 contacts the surface of the inner side wall guide and sealing flange 50 to effect a seal to prevent fluid flow around the slidable gate member 18.

FIG. 7 depicts a modification of the aperture sealing means of FIG. 2 wherein an upper second spring seal assembly, identical in all respects to the lower spring seal assembly, is used in place of the aperture blocks 32A and 32B of FIG. 2. In this type of tandem spring seal arrangement, the upper spring seal assembly operates as a secondary seal to better prevent leakage through aperture 20 in both the conduit-open and conduit-closed positions.

FIG. 7 depicts a further modification of the aperture sealing means by the addition of scraper plates 56A and 56B mounted on scraper mounting plates 58A and 58B. In the preferred embodiment the scraper plates 56A and 56B are flat metal plates of approximately 0.1 to 0.2 inch thickness which scrape foreign matter off the slidable gate member 18 on insertion and withdrawal from the conduit 10.

A further modification depicted in FIG. 7 is a means to attach the tandem sealing cartridge 62 to the gate valve assembly frame 12. A series of bayonet locking studs, of which one is shown 63, is fixedly mounted on the gate valve assembly frame 12 and cooperates with a slotted locking plate 64 to fixedly mount the tandem sealing cartridge 62. In this embodiment, as opposed to the use of threaded fasteners, e.g., nuts and bolts, the time and effort required to remove and replace sealing cartridge 62 are greatly facilitated. It will be appreciated that this means of mounting the aperture sealing means may be used in all the embodiments presented herein, and is not restricted in its usefulness to the tandem sealing cartridge depicted in FIG. 7.

We claim:

1. An apparatus for controlling the flow of a fluid comprising:
(a) a conduit for the transport and containment of the said fluid, said conduit having an aperture in its wall, generally transverse to the direction of fluid flow through the conduit and extending approximately the entire width of the conduit;
(b) a gate member adapted for sliding movement through the aperture between conduit-open position, wherein the gate member is withdrawn completely from the conduit, and conduit-closed position, wherein the gate member extends through the aperture and into the conduit to restrict the flow of the said fluid through the conduit;
(c) each conduit-transversing side of the aperture having one or more cooperating, flat sealing strips made of fluid-impermeable, resilient material, the strips being fixedly mounted in the apparatus, the combined width across the aperture of one or more of the said fixedly mounted opposing sealing strips in a plane perpendicular to the plane of the said gate member being greater than the width of the said aperture, such that when the gate member is withdrawn completely from the conduit one or more of the opposed sealing strips overlap in flat, sealing engagement, effectively closing the aperture and preventing the escape of fluid therethrough, and when the gate member is inserted through the aperture into the conduit the said flat sealing strips are bent aside by the gate member and biased against the opposite faces of the gate member in sealing engagement therewith.

2. The apparatus of claim 1 wherein the said flat sealing strips are made of spring-tempered sheet metal.

3. The apparatus of claim 1 wherein each conduit-traversing side of the aperture has a plurality of said flat sealing strips.

4. The apparatus of claim 3 wherein at least two of the sealing strips on each conduit-traversing side of the aperture are biased against the faces of the gate member in sealing engagement therewith when the gate member is in the conduit-closed position.

5. The apparatus of claim 4 wherein each conduit-traversing side of the aperture has a stack of four flat sealing strips, the two of which that are closest to the conduit being wide enough to reinforce the other two strips but not wide enough to overlap in the conduit-open position or to engage the faces of the gate member in the conduit-closed position.

6. The apparatus of claim 1 wherein there is mounted adjacent each of the said flat sealing strips a flat retainer plate member to prevent buckling of the said flat sealing strips during withdrawal of the said gate member from the said conduit.

7. The apparatus of claim 1 wherein the aperture is elongated and the long edges thereof extend generally transverse to the direction of fluid flow through the conduit.

8. The apparatus of claim 1 with at least one scraper blade positioned between the conduit and the said flat sealing strips for dislodging foreign matter from the surface of the gate member as it is slided into its conduit-open position.

9. The apparatus of claim 1 with means to hold a cover plate in sealing engagement with the said aperture during replacement of the said flat sealing strips.

10. The apparatus of claim 1 with two or more gate members in parallel arrangement.

11. The apparatus of claim 1 with two or more sets of cooperating flat sealing strips in parallel arrangement to seal the said aperture.

12. The apparatus of claim 1 with sealing leaf springs fixedly mounted on the side and bottom edges of the gate member to effect sealing engagement with the inner wall of the conduit in the conduit-closed position.

13. The apparatus of claim 1 wherein the said flat sealing strips are mounted in the apparatus by means of bayonet locking studs affixed to the apparatus and protruding through holes in the strips, said strips being held in place on said studs by a slotted locking plate.

* * * * *